W. G. TRETHEWEY.
FRICTION CLUTCH.
APPLICATION FILED JAN. 31, 1918.
1,282,147.
Patented Oct. 22, 1918.
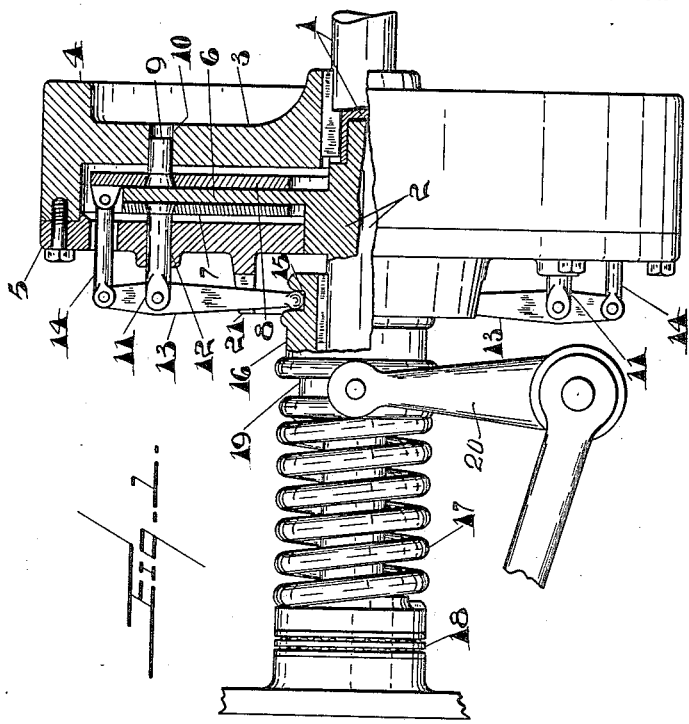
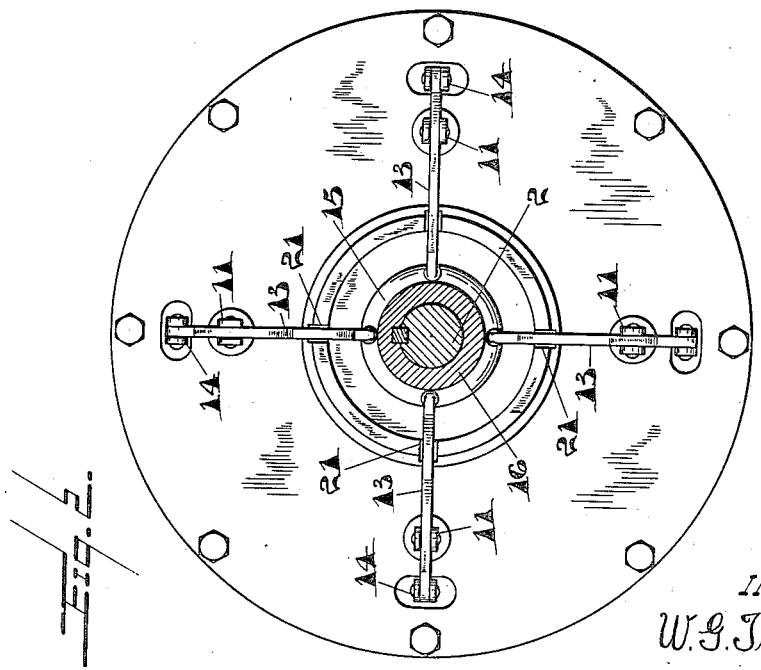
INVENTOR.
W. G. Trethewey
BY J. Edward Maybee.
ATTY.

UNITED STATES PATENT OFFICE.

WILLIAM G. TRETHEWEY, OF CUCKFIELD, ENGLAND.

FRICTION-CLUTCH.

1,282,147.  Specification of Letters Patent.  Patented Oct. 22, 1918.

Application filed January 31, 1918. Serial No. 214,647.

*To all whom it may concern:*

Be it known that I, WILLIAM GRIFFITH TRETHEWEY, of Cuckfield, county of Sussex, England, have invented certain new and useful Improvements in Friction-Clutches, of which the following is a specification.

This invention relates particularly to clutches used for coupling alined shafts, and my object is to devise a simple, strong and durable clutch of the disk type in which the working parts are completely housed and in which the friction disks are positively engaged and disengaged.

I attain my object by means of the constructions hereinafter described and illustrated in the accompanying drawings in which—

Figure 1 is a side elevation, partly in section, of my improved clutch; and

Fig. 2 a front elevation of the same.

In the drawings like numerals of reference indicate corresponding parts in the different figures.

1 and 2 are two shafts in alinement, the end of one being preferably turned down to fit a corresponding recess in the end of the other to properly maintain the shafts in alinement. 1 will usually be the driving shaft, and to this is secured the fly wheel casing, which comprises the disk 3 secured to the driving shaft, the rim 4 and the disk 5 secured to the rim and provided at its center with an opening for the passage of the driven shaft 2. To the driven shaft is secured the friction disk 6. 7 and 8 are floating friction disks located one at each side of the friction disk 6. The disk 8 is provided with a plurality of pins 9 adapted to engage in holes 10 formed in the disk. The disk 7 is provided with a plurality of pins 11, preferably four in number, each of which extends through a hole 12 in the disk 5. To the ends of the pins 11 are pivoted the levers 13. The outer ends of the levers 13 are pivotally connected with the links 14, which extend through suitable openings adjacent the rim 4 and are pivotally connected with the disk 8. The inner ends of the levers 13 are preferably rounded as shown and fit in a groove 15 formed in a sleeve 16 slidable on a feather key on the shaft 2. A coil spring 17 bears at one end against the sleeve 16 and at the other end, by means of a thrust bearing 18, against a suitable stationary part such as a bearing for the shaft 2.

A groove 19 is formed in the sleeve 16 engaged by a suitable shifter lever 20 as shown. From the above description it will be seen that when the shifter lever is left free that the coil spring will actuate the levers 13 to positively move the floating friction disks 7 and 8 against the opposite sides of the friction disk 6, thus forming a driving connection between the two shafts. When the shifter is operated to move outwardly, the inner ends of the levers 13, the floating disks are spread apart and as one of them must necessarily very shortly contact with one of the sides of the fly wheel casing, further movement of the shifter lever at once disengages the other from contact with the opposite side of the disk 6, so that I absolutely insure that both floating disks will be freed from the fixed disk no matter how stiffly the pins 9 and 11 may move in their respective holes. It will further be seen that all the frictional parts are completely inclosed and are thus protected from dust and moisture.

On the disk 5 I provide forked guides 21, which embrace the levers 13 near their inner ends and thus prevent undue lateral strain on the lever ends due to the friction of the grooved sleeve.

The device is also very simple, strong and durable.

What I claim as my invention is:—

1. A clutch for coupling alined shafts comprising a fly wheel casing secured to one shaft, having a central opening in one side for the passage of the other shaft, openings in said side remote from the shafts for the passage of connecting links and holes in each side for engagement by driving pins; a friction disk secured to the second shaft within the casing; floating friction disks located one at each side of the fixed disk and provided with driving pins entering the pine holes aforesaid, the pins on the floating disk adjacent the side of the casing through which the second shaft passes extending out through the pin holes; levers fulcrumed on the ends of said last mentioned pins; connecting links pivoted to said levers passing through the connecting link openings aforesaid and pivoted to the floating disk remote from the levers; and means for actuating said levers to engage or release the friction disks.

2. A clutch for coupling alined shafts comprising a fly wheel casing secured to one shaft, having a central opening in one side for the passage of the other shaft, openings in said side remote from the shafts for the passage of connecting links and holes in each side for engagement by driving pins; a friction disk secured to the second shaft within the casing; floating friction disks located one at each side of the fixed disk and provided with driving pins entering the pin holes aforesaid, the pins on the floating disk adjacent the side of the casing through which the second shaft passes extending out through the pin holes; levers fulcrumed on the ends of said last mentioned pins; connecting links pivoted to said levers passing through the connecting link openings aforesaid and pivoted to the floating disk remote from the levers; and means for actuating said levers to engage or release the friction disks comprising a sleeve provided with a groove in which the lever ends engage, said sleeve being slidable on but rotatable with the said second shaft, a spring tending to move the sleeve to engage the clutch, and means for manually shifting the sleeve to disengage the clutch.

3. A clutch for coupling alined shafts comprising a fly wheel casing secured to one shaft, having a central opening in one side for the passage of the other shaft, openings in said side remote from the shafts for the passage of connecting links and holes in each side for engagement by driving pins; a friction disk secured to the second shaft within the casing; floating friction disks located one at each side of the fixed disk and provided with driving pins entering the pin holes aforesaid, the pins on the floating disk adjacent the side of the casing through which the second shaft passes extending out through the pin holes; levers fulcrumed on the ends of said last mentioned pins; forks on the fly wheel casing forming guides for the levers; connecting links pivoted to said levers passing through the connecting link openings aforesaid and pivoted to the floating disk remote from the levers; and means for actuating said levers to engage or release the friction disks.

Signed at Cuckfield, Sussex, Eng., this 2nd day of January, 1918, in the presence of the two undersigned witnesses.

W. G. TRETHEWEY.

Witnesses:
LESLIE HAWKINS,
PHILIP C. GARRATT.